United States Patent
Pothana (10) Patent No.: US 6,987,961 B1
(45) Date of Patent: Jan. 17, 2006

(54) ETHERNET EMULATION USING A SHARED MAILBOX BETWEEN TWO PROCESSORS IN A FEATURE PHONE

(75) Inventor: Sai K. Pothana, Sunnyvale, CA (US)

(73) Assignee: NeoMagic Corp., Santa Clara, CA (US)

( * ) Notice: Subject to any disclaimer, the term of this patent is extended or adjusted under 35 U.S.C. 154(b) by 4 days.

(21) Appl. No.: 10/710,238

(22) Filed: Jun. 28, 2004

(51) Int. Cl.
*H04M 1/00* (2006.01)

(52) U.S. Cl. .................. 455/412.1; 455/550.1
(58) Field of Classification Search ............ None
See application file for complete search history.

(56) References Cited

U.S. PATENT DOCUMENTS

| | | | |
|---|---|---|---|
| 5,794,054 A | 8/1998 | Le et al. ............... | 710/240 |
| 5,842,015 A | 11/1998 | Cunniff et al. ............. | 718/104 |
| 6,567,507 B1 | 5/2003 | Shaffer et al. ........... | 379/88.19 |
| 6,643,362 B2 | 11/2003 | Hogan et al. ............... | 379/196 |
| 2002/0055979 A1 | 5/2002 | Adams ...................... | 709/212 |
| 2002/0124100 A1 | 9/2002 | Adams ...................... | 709/232 |
| 2002/0136225 A1 * | 9/2002 | Joy et al. ................... | 370/401 |
| 2003/0009692 A1 | 1/2003 | Smith et al. ................ | 713/201 |
| 2003/0012183 A1 | 1/2003 | Butler et al. ............... | 370/352 |
| 2003/0212821 A1 * | 11/2003 | Gillies et al. ............... | 709/238 |
| 2004/0032393 A1 | 2/2004 | Brandenberg et al. ...... | 345/156 |
| 2004/0054739 A1 | 3/2004 | Friend, et al. ............. | 709/206 |
| 2004/0054743 A1 | 3/2004 | McPartlan et al. .......... | 709/206 |
| 2004/0176059 A1 * | 9/2004 | Hayem et al. ........... | 455/168.1 |
| 2005/0048997 A1 * | 3/2005 | Grobler et al. .......... | 455/550.1 |

\* cited by examiner

*Primary Examiner*—Rafael Perez-Gutierrez
*Assistant Examiner*—Marisol Figueroa
(74) *Attorney, Agent, or Firm*—Stuart T. Auvinen (57) ABSTRACT

A feature phone has a base-band processor and an applications processor that communicate with each other by emulating an internal Ethernet within the phone. TCP/IP stacks in each processor receive data from high-level applications for transmission to the other processor. Ethernet-emulating drivers are called by the IP layers. An Ethernet-emulating transmit driver writes IP-packet data to a shared memory and sends an interrupt to the other processor, which activates a receive routine that reads the IP packet data from the shared memory and sends it up through the TCP/IP stack. There is no twisted-pair cable or other media since the shared memory acts as the transfer media. A shared mailbox holds the packet length and sends an interrupt to one processor when written, while a general-purpose input-output GPIO module sends an interrupt to the other processor. The internal emulated-Ethernet is entirely within the phone and separate from cellular networks.

22 Claims, 11 Drawing Sheets

ETHERNET EMULATION USING A SHARED MAILBOX BETWEEN TWO PROCESSORS IN A FEATURE PHONE

BACKGROUND OF INVENTION

This invention relates to mobile feature phones, and more particularly to inter-processor communications within a feature phone using an Ethernet-emulating driver and TCP/IP.

Cellular or mobile phones have gained widespread acceptance. Improvements in capabilities and features have been made as newer generations of mobile phones and infrastructure are introduced. Third and fourth generation (3G and 4G) phones can access high-bandwidth cellular networks, enabling video, gaming, and other multimedia services.

Figure 1:
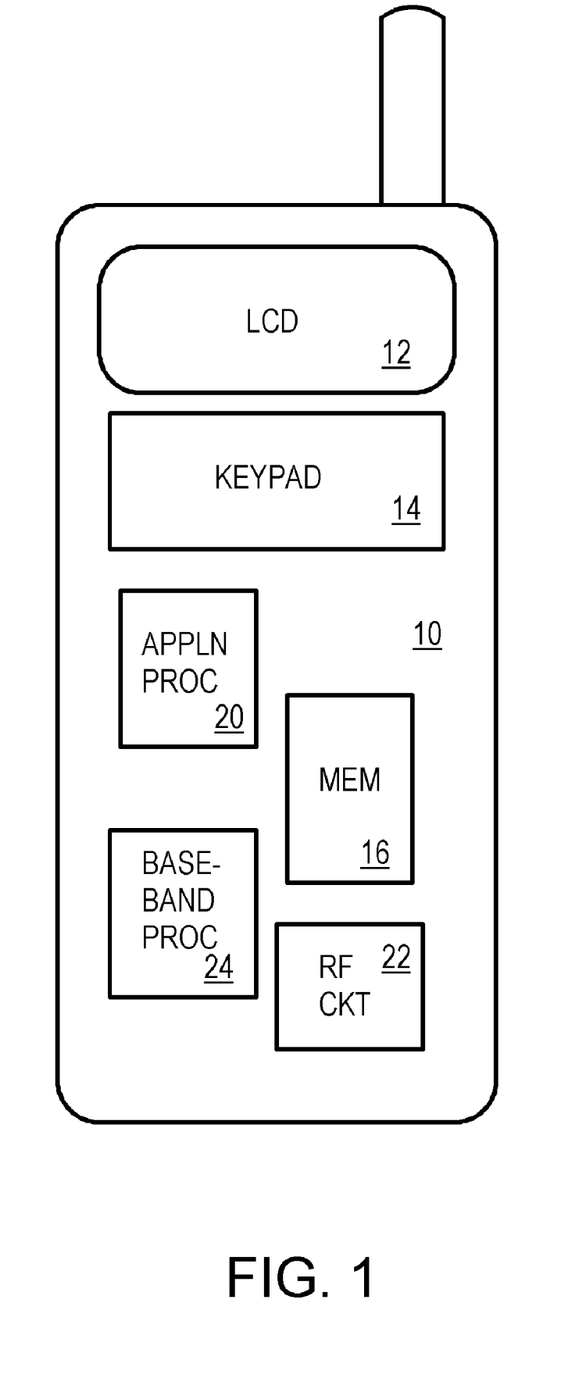
FIG. 1 shows a feature phone with two processors.

While there may be various implementations of feature phones, a dual-processor implementation is sometimes used. FIG. 1 shows a feature phone with two processors. Feature phone 10 has advanced capabilities, and includes applications processor 20 to execute programs that implement some of these more advanced features, such as H.264 or MPEG-4 video encoding and decoding, camera support, and MP3 audio player support.

Radio-frequency RF circuit 22 includes one or more chips and transmits and receives radio signals over the antenna of phone 10. These signals are converted to digital form and communicated with base-band processor 24. Control of the transceiver and implementation of cellular communications protocols is handled by base-band processor 24.

Information such as phone numbers, call status, and menus are displayed to a phone user on display 12, which may be a liquid crystal display (LCD). Keypad 14 accepts user-inputted phone numbers and text, with keys for sending and ending a call in addition to numeric telephone keys. Control over keypad 14 and display 12 is handled by base-band processor 24.

Having a separate applications processor 20 can provide a more robust phone platform since base-band processor 24 does not have to been significantly altered for advanced features, which are executed on applications processor 20.

User data such as call logs, phone numbers, and user preferences are stored in memory 16. Memory 16 can be a static random-access memory (SRAM), flash, or other non-volatile memory. Memory 16 can be accessed by base-band processor 24 and/or by applications processor 20. Data can be shared when both processor have operating systems that can recognize file formats used by the other processor.

Some data must be transferred between base-band processor 24 and applications processor 20. For example, video or picture data may be received over the cell network by base-band processor 24 and transferred to applications processor 20 for further processing, or a digital camera image captured by applications processor 20 may be sent to base-band processor 24 for transmission over the cell network.

The interface between applications processor 20 and base-band processor 24 may be difficult to use. For examples, special software drivers may need to be written for execution on both applications processor 20 and base-band processor 24 for transferring various types of data. Lower-level software or operating system modules may need to be modified. Such changes require extensive compatibility testing to ensure that the phones do not fail in the field. Developing a protocol as versatile and stable as TCP/IP protocol is difficult.

Figure 2:
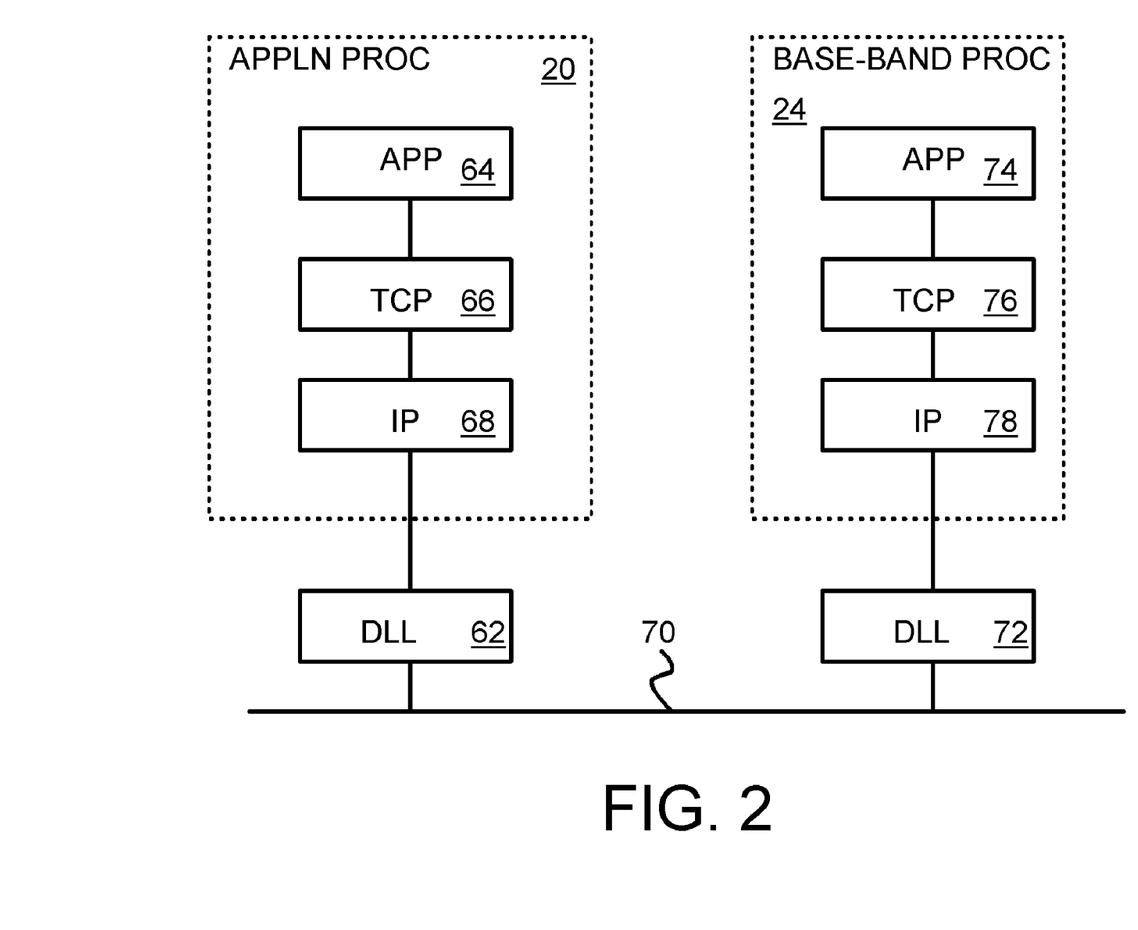
FIG. 2 shows a concept of adding Ethernet to a feature phone.

Networks such as Transport-Control-Protocol/Internet Protocol (TCP/IP) and Ethernet are used by larger computing platforms for data transfer. However, the cell phone is so small that adding Ethernet hardware is problematic. FIG. 2 shows a concept of adding Ethernet to a feature phone. This is only a concept since the inventor is not aware of such a cell phone having an Ethernet chip.

High-level applications 64 execute on applications processor 20, and could send information over network 70 by sending information down a network stack. TCP layer 66 receives network requests from high-level user applications 64 and forms TCP packets. TCP headers, containing sequence and acknowledgement numbers, ports for the source (client application) and destination (server application) and a TCP checksum are generated and prepended to the packet.

IP layer 68 receives the TCP packets from TCP layer 66 and generates Internet Protocol (IP) addresses for the client machine and the server machine. Applications processor 20 could act as the client and base-band processor 24 as the server, or vice-versa. An IP header, containing the addresses and an IP checksum is generated and prepended. The TCP packet with the user-application data is contained within the IP packet.

IP packets from IP layer 68 are sent to data-link layer (DLL) 62. DLL 62 contains the low-level network-card software drivers, such as an Ethernet-card driver. DLL 62 writes and reads registers on a network card or Ethernet chip to send packets over the physical media of network 70.

Base-band processor 24 also connects to network 70 using data-link layer DLL 72. Packets are passed up the server's network stack to IP layer 78 and TCP layer 76 before the data is sent to high-level application 74. Application 74 executing on base-band processor 24 responds to the high-level request from high-level client application 64 executing on applications processor 20 by fetching the desired data and transmitting it back over network 70.

DLL 62, 72 and network 70 can be implemented as an Ethernet chip for applications processor 20 and another Ethernet chip for base-band processor 24. Network-card software drivers are loaded onto both applications processor 20 and base-band processor 24 and are called by IP layers 68, 78. Network 70 can include the physical network such as a twisted-pair cable. However, in a cell phone there is very little space to add 2 Ethernet chips, and to add a twisted-pair cable between the 2 Ethernet chips.

What is desired is a feature phone with a highly-compatible interface between the applications processor and base-band processor. An interface between processors in a feature phone is desired that uses existing standard software drivers as much as possible to reduce compatibility issues. An Ethernet interface that is called by a standard TCP/IP stack is desirable.

DETAILED DESCRIPTION

The present invention relates to an improvement in feature phones. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
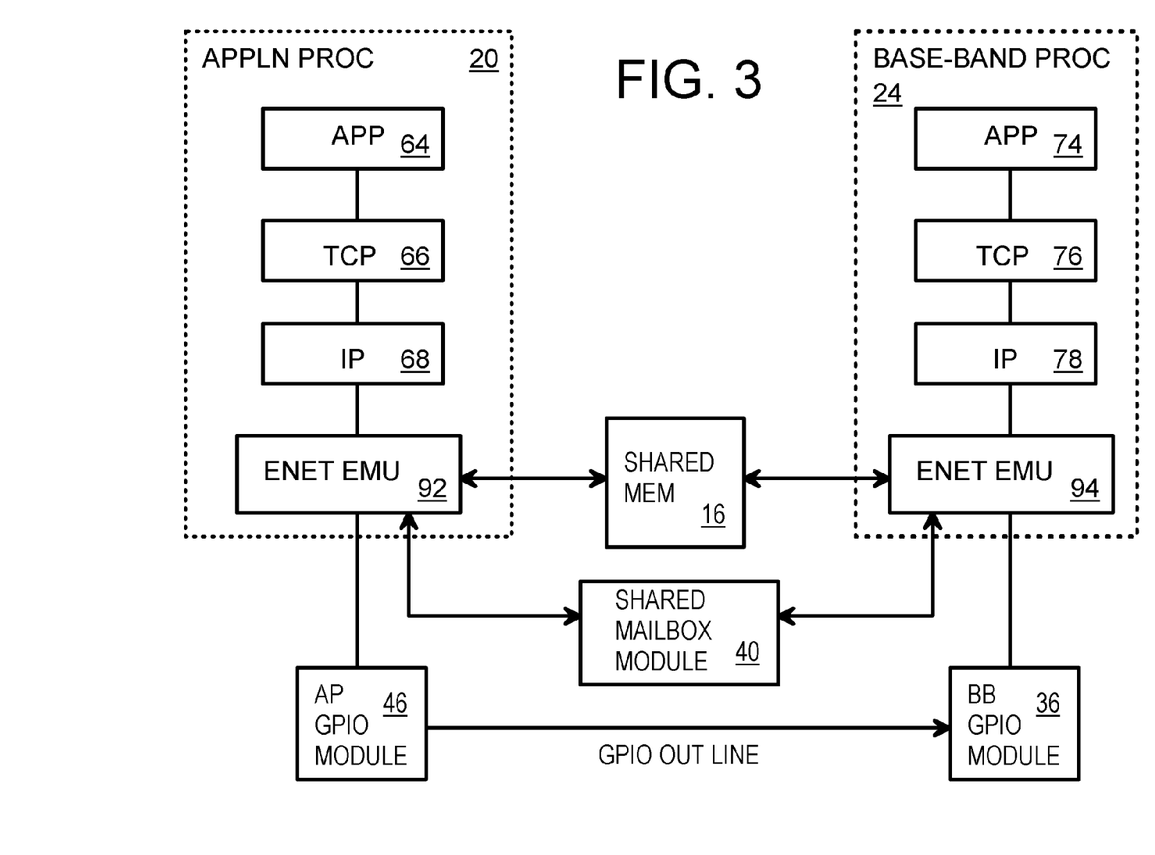
FIG. 3 shows processors in a feature phone connected together by an emulated network.

FIG. 3 shows processors in a feature phone connected together by an emulated network. High-level applications 64 executing on applications processor 20 communicate with high-level applications 74 that are executing on base-band processor 24 using a TCP/IP network that calls a lower-level emulated Ethernet.

The inventor has realized that existing processors used in feature phones often have operating systems that have existing network stacks for Transport-Control-Protocol/Internet Protocol (TCP/IP), even though the feature phones do not connect to a TCP/IP network. Most mobile phones connect to wireless networks using wireless protocol standards such as Global System for Mobile Communications (GSM), Code Division Multiple Access (CDMA), and General Packet Radio Service (GPRS). TCP/IP is not used to format transmissions over the wireless cellular phone networks. However, the TCP/IP stacks and drivers are present in the operating systems for the processors used in feature phones, since these processors are sued in a wide variety of non-phone applications such as peripherals, controllers, and small computers.

Since the standard operating systems for the processors used in feature phones already have a TCP/IP stack, the inventor realizes that a TCP/IP network could be built within a feature phone. High-level applications 64 can call TCP layer 66 which in turn calls IP layer 68 to send data as packets over a TCP/IP network. TCP layer 66 and IP layer 68 are standard parts of the operating system running applications processor 20.

IP layer 68 calls a lower-level DLL or Ethernet-card driver to send the IP packets. However, rather than having a real Ethernet chip, the internal TCP/IP network has a lower-level virtual Ethernet. The virtual Ethernet has special Ethernet drivers but no Ethernet chips or twisted-pair cables.

Ethernet-emulating driver 92 is activated by IP layer 68 of the standard TCP/IP stack when higher-level application 64 transmits packets using the O/S TCP/IP drivers. Ethernet-emulating driver 92 writes packet data into shared memory 16 rather than to an Ethernet chip driving a twisted-pair cable. Once the packet data is written to memory 16, Ethernet-emulating driver 92 sends and interrupt to Ethernet-emulating driver 94 on base-band processor 24 by sending an interrupt over an general-purpose input-output (GPIO) line using GPIO modules 46, 36. The interrupt causes base-band processor 24 to activate Ethernet-emulating driver 94 to read the packet data from shared memory 16. The packet data may be stripped of any Ethernet formatting and sent up to IP layer 78, which removes IP headers and sends the data up to TCP layer 76. Alternately, the Ethernet formatting may remain with the data. TCP layer 76 strips off the TCP header and sends the message data up to high-level application 74.

For return data from base-band processor 24 to applications processor 20, data is passed down from high-level application 74 to TCP layer 76, which adds a TCP header, and to IP layer 78, which adds an IP header. The IP packet is sent to Ethernet-emulating driver 94 which writes the data to shared memory 16 and sends an interrupt to applications processor 20 using shared mailbox 40. Shared mailbox 40 is a module on applications processor 20 that allows for inter-processor communication and message passing. Ethernet-emulating driver 92 is activated by the shared-mailbox interrupt and reads the packet data from shard memory 16. The packet data is passed up through IP layer 68 and TCP layer 66, and the data, stripped of TCP and IP headers and checksums, is sent to high-level application 64.

The internal Ethernet has no twisted pair cabling or Ethernet chips, and is implemented by Ethernet-emulating drivers 92, 94 which use shared memory 16 as the transmit and receive buffers. Pseudo-asynchronous packet transfer is achieved by sending interrupts using existing hardware and software resources, such as shared mailbox 40 and GPIO modules 36, 46.

This internal Ethernet is used only for communication between the applications processor and base-band processor within the feature phone. The internal Ethernet is not used for external communications. Thus a very small Ethernet is emulated within the feature phone for inter-processor, intra-phone communications. The internal Ethernet does not normally extend beyond the phone casing, but could for testing purposes.

Ethernet-emulating drivers 92, 94 are pseudo-Ethernet drivers since they appear to be standard Ethernet drivers to the higher-level TCP/IP stack. The pseudo-Ethernet drivers read and write packet data to and from the shared memory, rather than to twisted-pair drivers and receivers. The shared mailbox or GPIO is used to send an interrupt to activate the pseudo-Ethernet driver in the other processor. Thus there is no actual Ethernet, but just a software driver appearing to be an Ethernet driver to higher software layers.

Figure 4:
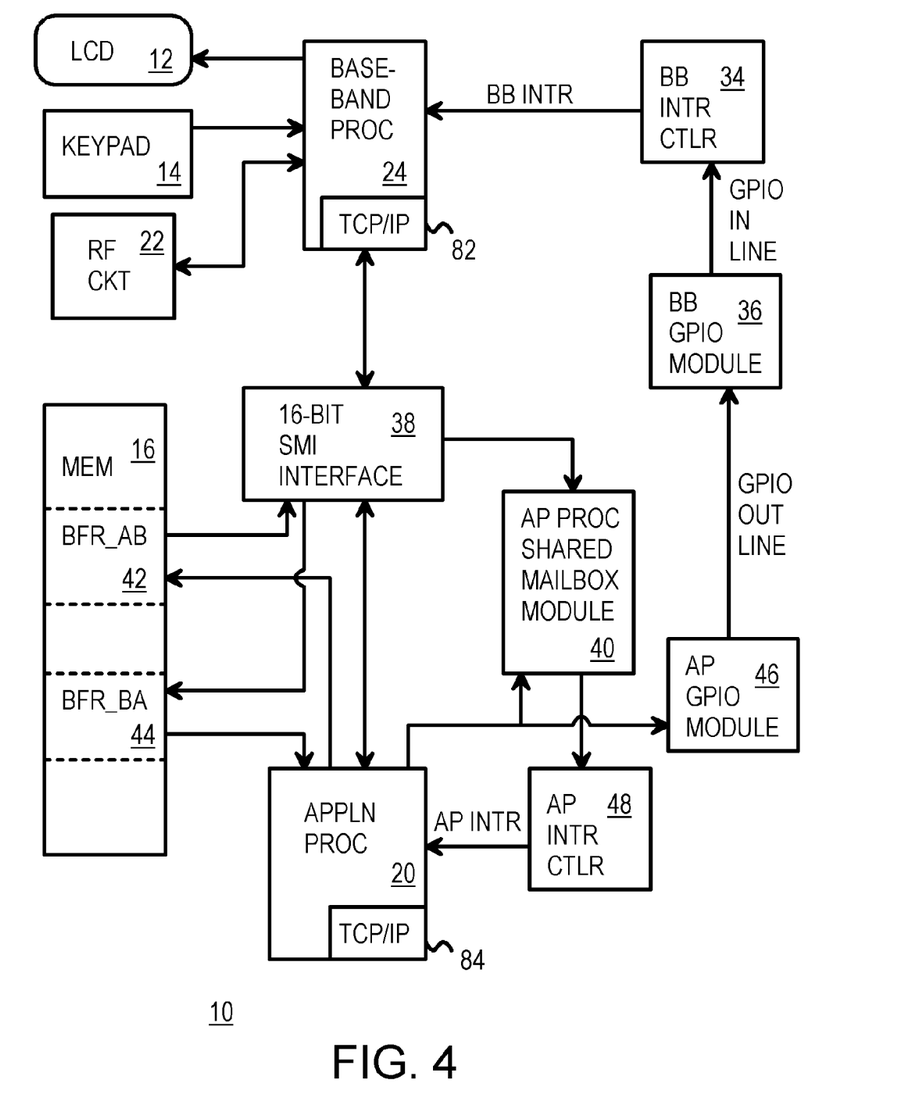
FIG. 4 is a diagram of a feature phone with Ethernet-emulation.

FIG. 4 is a diagram of a feature phone with Ethernet-emulation. Base-band processor 24 receives user input from keypad 14 sends display information to the user on display 12. RF circuit 22 sends and receives phone-call data over a radio link to a cellular base station. Base-band processor 24 acts as the controlling processor while applications processor 20 acts as a subordinate processor. Rigorous testing and prior use in phones without an applications processor allow base-band processor 24 to provide a stable platform, while newer features are executed by applications processor 20. Thus many bugs and potential phone crashes are isolated from base-band processor 24.

Advanced features are provided by high-level applications that execute on applications processor 20. A 16-bit shared-memory-interface (SMI) links applications processor 20 to base-band processor 24 through shared memory 16. base-band processor 24 can read and write data to shared memory 16 through shared-memory interface 38 while applications processor 20 reads and writes shared memory 16 directly.

Shared memory 16 contains packet-data buffers used by the Ethernet-emulating drivers to pass packet data. A-to-B buffer 42 is written by packet data from Ethernet-emulating driver 92 when called by TCP/IP stack 84 when an application executing on applications processor 20 sends data to the network. A-to-B buffer 42 is read by Ethernet-emulating driver 94 through shared-memory interface 38 when called by TCP/IP stack 82 on base-band processor 24.

B-to-A buffer 44 is written through shared-memory interface 38 by packet data from Ethernet-emulating driver 94 when called by TCP/IP stack 82 when an application executing on base-band processor 24 sends data to the network. B-to-A buffer 44 is read by Ethernet-emulating driver 92 when called by TCP/IP stack 84 on applications processor 20. Shared memory 16 may contain non-buffer memory, or it may be entirely used for buffer memory. For example, a 32 K-byte memory could have addresses 0–16 K for B-to-A buffer 44 and addresses 16–32 K for A-to-B buffer 42.

Since packets may be sent at various times, the receiving processor's Ethernet-emulating driver must be notified when a new packet has been written into shared memory 16 and is ready for reading. Interrupts are used for such notification. A GPIO line is used as an interrupt to baseband processor 24, while shared mailbox 40 is used for interrupts to applications processor 20.

When applications processor 20 finishes writing packet data to shared memory 16, applications processor 20 toggles the state of an I/O line using GPIO module 46. The changed state of the GPIO line is detected by GPIO module 36, which activates an interrupt to base-band processor 24 using base-band interrupt controller 34. Base-band interrupt controller 34 and GPIO module 36 can be integrated together with base-band processor 24 on the same chip as a base-band microcontroller.

When base-band processor 24 finishes writing a packet to shared memory 16 through shared-memory interface 38, base-band processor 24 writes a message into shared mailbox 40. Writing of this message causes shared mailbox 40 to generate an interrupt to interrupt controller 48 that is passed to applications processor 20. Applications processor 20 can then respond to the interrupt by activating its Ethernet-emulating driver 92, which reads the packet data from shared memory 16 and passes the data to TCP/IP stack 84 and eventually to a high-level application in applications processor 20.

Shared-memory interface 38, shared mailbox 40, interrupt controller 48, and GPIO module 46, can be integrated together with applications processor 20 as a single chip. Shared memory 16 may also be integrated, or may be separate or part of a larger external memory. TCP/IP stacks 82, 84 are software modules.

Figure 5A:
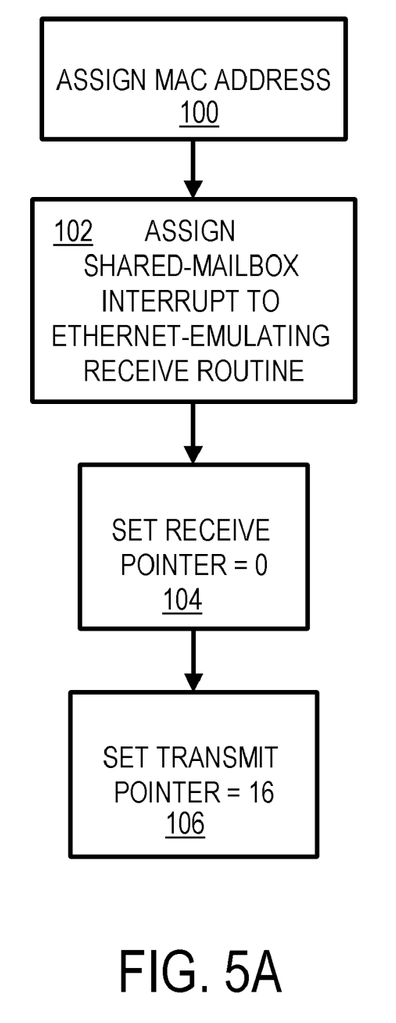
FIG. 5A is a flowchart of an initialization routine for the Ethernet-emulating driver on the applications processor.

FIG. 5A is a flowchart of an initialization routine for the Ethernet-emulating driver on the applications processor. The Ethernet-emulating driver includes the initialization routine of FIG. 5A, the interrupt-service routine of FIG. 6A, the receive routine of FIG. 7A, and the transmit routine of FIG. 8A.

During initialization, such as after re-booting of the feature phone or the applications processor, a media-access-controller MAC address is assigned (step 100) to the applications processor. This can be a dummy MAC address since the emulated Ethernet does not connect to an outside Ethernet. The shared-mailbox interrupt is assigned to the receive routine of the Ethernet-emulating driver by updating interrupt tables in the operating system controlling applications processor 20, step 102. When the shared mailbox interrupt is activated, the operating system activates the receive routine of FIG. 7A to handle the interrupt.

Pointers for A-to-B buffer 42 and B-to-A buffer 44 in shared memory 16 are initialized. The receive pointer for applications processor (A) is the read pointer to B-to-A buffer 44, while the transmit pointer for applications processor 20 is the write pointer for A-to-B buffer 42. The first 16 K bytes of shared memory 16 is used as B-to-A buffer 44 while bytes 16K–32K are used as A-to-B buffer 42.

In step 104, the receive pointer is set to 0, the first location in B-to-A buffer 44, while in step 106 the transmit pointer is set to 16, the first location in A-to-B buffer 42. B-to-A buffer 44 is the first 16 K bytes of shared memory 16 in this embodiment. The pointers are incremented by 1 K bytes for each packet, since the Ethernet packet is set to 1 K bytes for convenience.

Figure 5B:
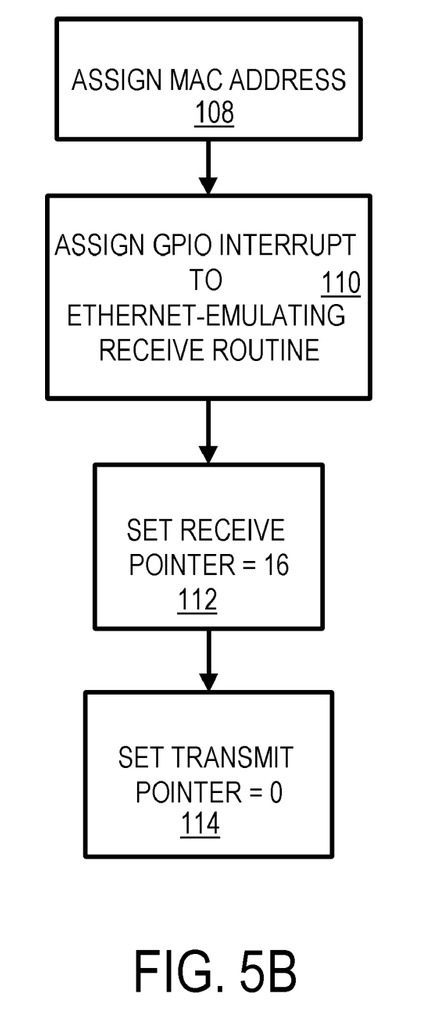
FIG. 5B is a flowchart of an initialization routine for the Ethernet-emulating driver on the base-band processor.

FIG. 5B is a flowchart of an initialization routine for the Ethernet-emulating driver on the base-band processor. The Ethernet-emulating driver includes the initialization routine of FIG. 5B, the interrupt-service routine of FIG. 6B, the receive routine of FIG. 7B, and the transmit routine of FIG. 8B.

During initialization, such as after re-booting of the feature phone or the base-band processor, a media-access-controller MAC address is assigned (step 108) to the base-band processor. This can be another dummy MAC address that is different than the dummy MAC address assigned to applications processor.

The GPIO interrupt is assigned to the receive routine of the Ethernet-emulating driver by updating interrupt tables in the operating system controlling base-band processor 24, step 110. When the GPIO interrupt is activated, the operating system activates the receive routine of FIG. 7B to handle the interrupt.

Pointers for A-to-B buffer 42 and B-to-A buffer 44 in shared memory 16 are initialized. The receive pointer for base-band processor (B) is the read pointer to A-to-B buffer 42, while the transmit pointer for base-band processor 24 is the write pointer for B-to-A buffer 44. In step 112, the receive pointer is set to 16, the first location in A-to-B buffer 42, while in step 114 the transmit pointer is set to 0, the first location in B-to-A buffer 44.

Figure 6A:
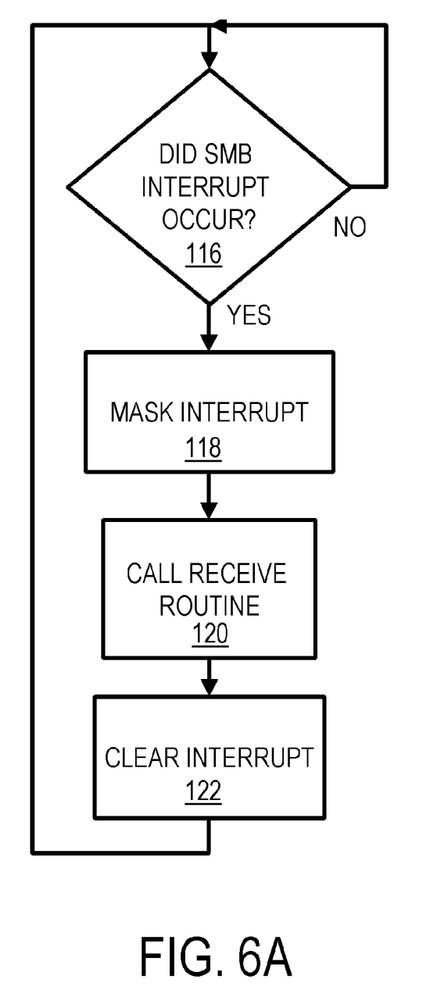
FIG. 6A is a flowchart of a shared-mailbox interrupt service routine for the applications processor.

FIG. 6A is a flowchart of a shared-mailbox interrupt service routine for the applications processor. When a shared mailbox interrupt is received, step 116, the operating system masks new interrupts, step 118, while processing this interrupt. The receive routine (FIG. 7A) of the Ethernet-emulating driver is called, step 120. The shared-mailbox interrupt is cleared, step 122, allowing the operating system to respond to new interrupts. This routine can be part of the operating system or hardware that responds to interrupts.

Figure 6B:
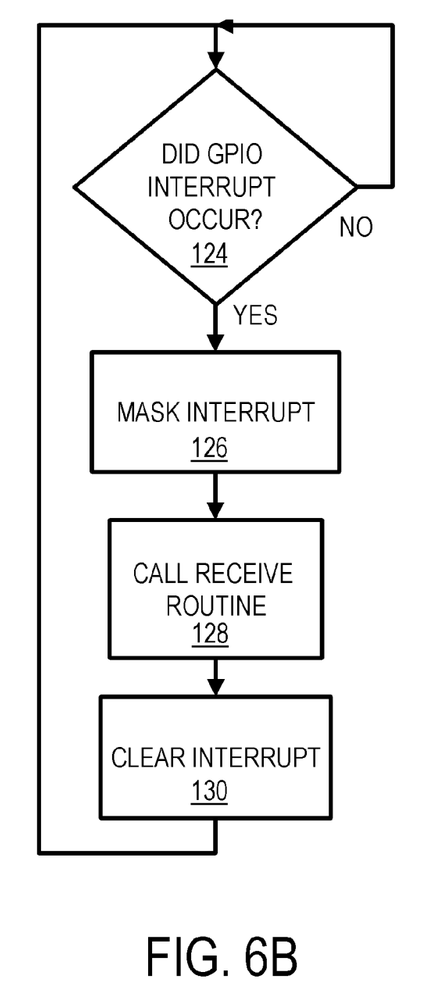
FIG. 6B is a flowchart of a GPIO interrupt service routine for the base-band processor.

FIG. 6B is a flowchart of a GPIO interrupt service routine for the base-band processor. When a GPIO interrupt is received, step 124, the operating system masks new interrupts, step 126, while processing this interrupt. The receive routine (FIG. 7B) of the Ethernet-emulating driver is called, step 128 and executed on the base-band processor. The GPIO interrupt is cleared, step 130, allowing the operating system to respond to new interrupts. This routine can be part of the operating system or hardware that responds to interrupts.

Figure 7A:
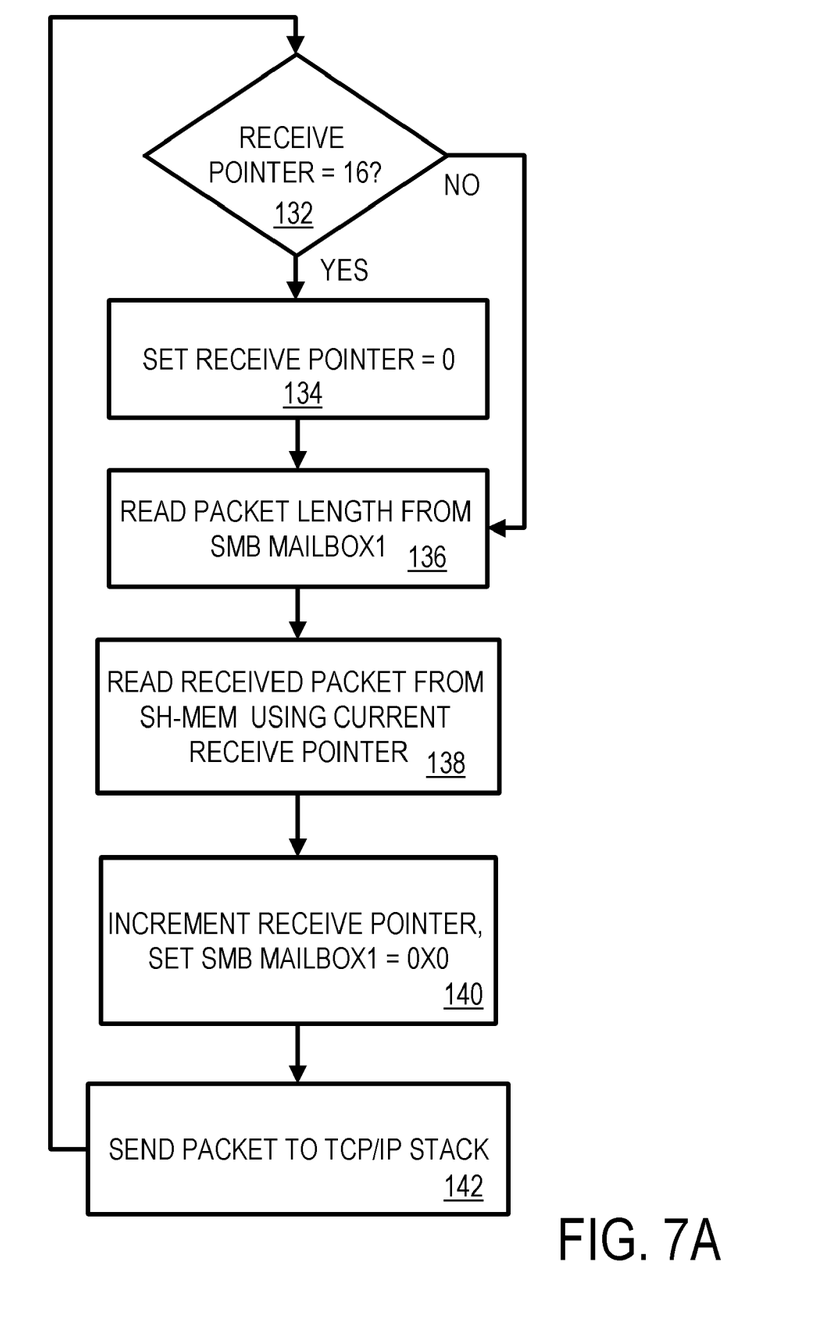
FIG. 7A is a flowchart of the receive routine for the Ethernet-emulating driver executing on the applications processor.

FIG. 7A is a flowchart of the receive routine for the Ethernet-emulating driver executing on the applications processor. Pointer locations 0–16 are in B-to-A buffer 44. When the receive pointer has reached the end of B-to-A buffer 44, the pointer value is 16, step 132. Then the pointer wraps around to the first location, by setting the receive pointer to 0, step 134. Otherwise the receive pointer is unaltered.

Shared mailbox 40 can have several locations, such as mailbox #1, mailbox #2, etc. The packet length is read from mailbox #1 in shared mailbox 40, step 136. The packet length can be less than 1 K bytes, even though the pointers increment by 1 K bytes for each packet. The receive pointer is used to read the new packet from shared memory 16, step 138. Only bytes up to the packet length are read. The receive pointer is incremented, and a zero-value is written to shared mailbox #1 to acknowledge receipt of the packet, step 140.

The packet data read from the shared memory is sent up to the TCP/IP stack, step 142. The TCP/IP stack removes the IP and TCP headers that contain send and receive IP addresses and other protocol information. Checksums can also be verified to ensure accurate data transmission and request a re-transmit if an error occurred.

Figure 7B:
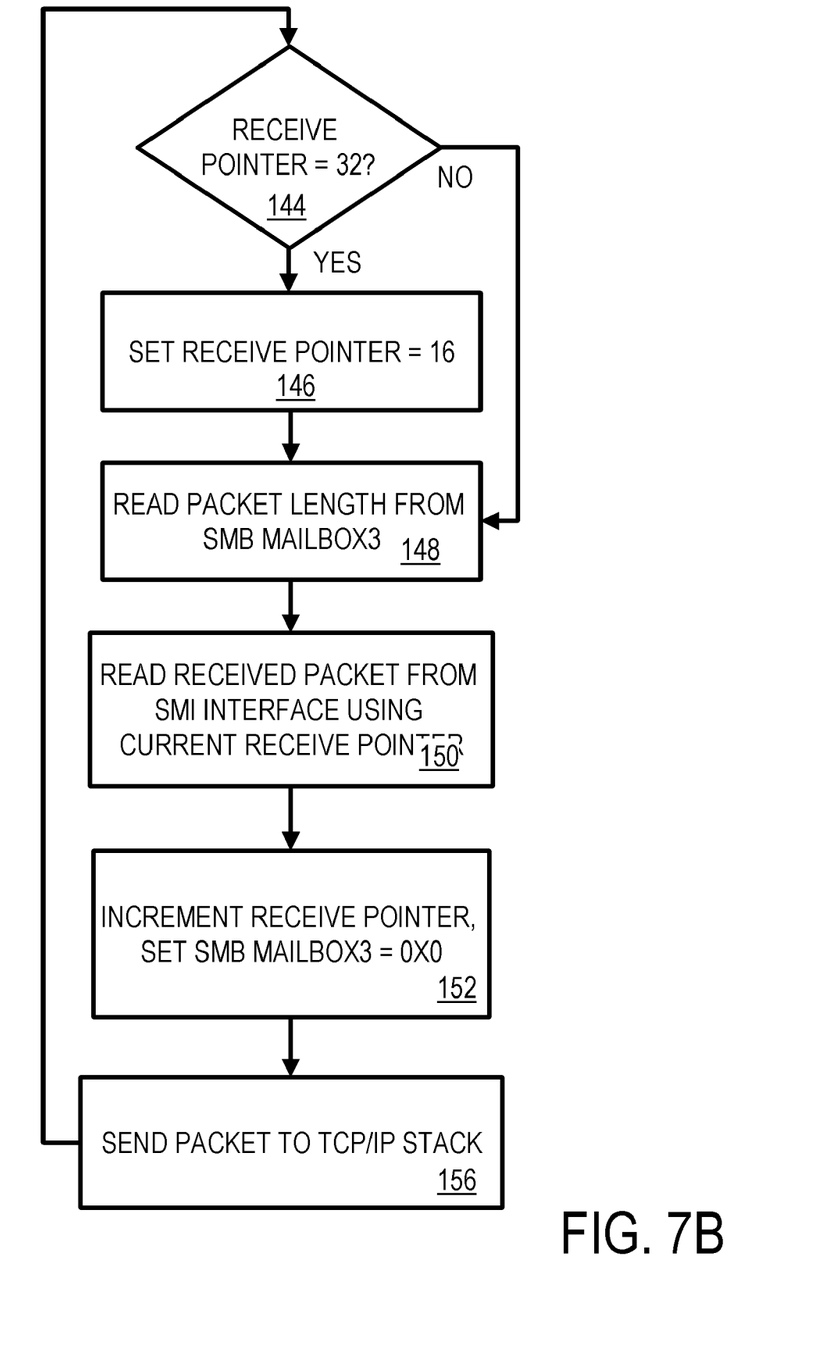
FIG. 7B is a flowchart of the receive routine for the Ethernet-emulating driver executing on the base-band processor.

FIG. 7B is a flowchart of the receive routine for the Ethernet-emulating driver executing on the base-band processor. Pointer locations 16–32 are in A-to-B buffer 42. When the receive pointer has reached the end of A-to-B buffer 42, the pointer value is 32, step 144. Then the pointer wraps around to the first location (16), by setting the receive pointer to 16, step 146. Otherwise the receive pointer is unaltered.

The packet length is read from mailbox #3 in shared mailbox 40, step 148. The packet length can be less than 1 K bytes, even though the pointers increment by 1 K bytes for each packet. The receive pointer is used to read the new packet from shared memory 16 through shared-memory interface 38, step 150. The receive pointer is incremented, and a zero-value is written to shared mailbox #3 to acknowledge receipt of the packet, step 152.

The packet data read from the shared memory is sent up to the TCP/IP stack on base-band processor 24, step 156. The TCP/IP stack removes the IP and TCP headers that contain send and receive IP addresses and other protocol information. Checksums can also be verified to ensure accurate data transmission and request a re-transmit from applications processor 20 if an error occurred.

Figure 8A:
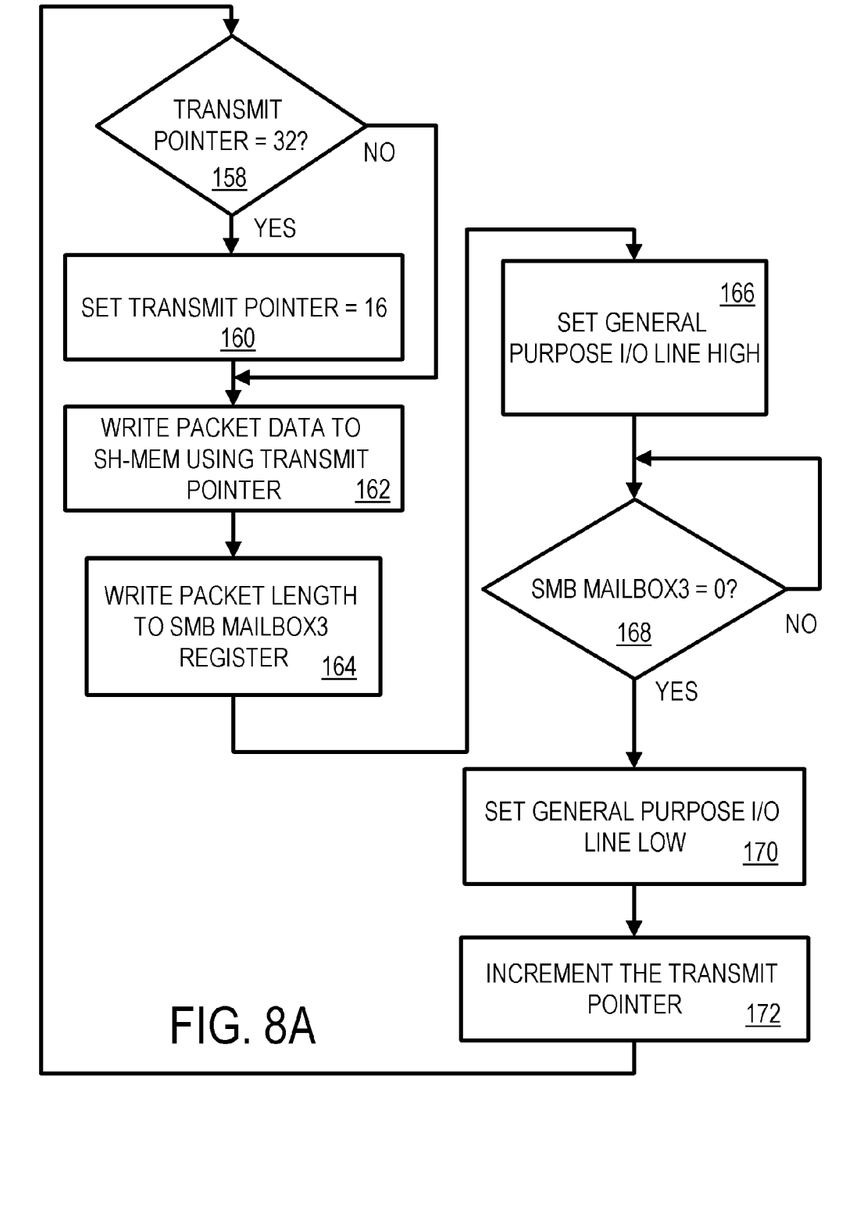
FIG. 8A is a flowchart of a transmit routine for an Ethernet-emulating driver executing on the applications processor.

FIG. 8A is a flowchart of a transmit routine for an Ethernet-emulating driver executing on the applications processor. A high-level application sends data to the O/S TCP/IP stack for transmission over the internal Ethernet to the base-band processor. The IP layer activates this transmit routine since the Ethernet-emulating driver appears to be the lower-level Ethernet-chip driver.

When the transmit pointer has reached the end of A-to-B buffer 42, step 158, the pointer value of 32 is wrapped back to 16, the first location in the buffer, step 160. This transmit pointer is used to select locations in the shared memory to write the packet data to, step 162. The packet data could be the unmodified IP packet, or it could be modified to be an Ethernet packet, such as by adding the MAC address, protocol type, and IP addresses. Larger IP packets could be divided into several 1K-byte Ethernet packets that are separately transmitted, and packet sequence numbers could be added.

The length of the packet is written to mailbox #3, step 164. This length can be 1 K bytes or less than 1 K bytes for smaller packets. Notification is sent to base-band processor 24 by driving the GPIO line high, step 166. This can be done by writing a 1 to a GPIO register. The transmit routine then repeatedly re-reads or polls mailbox #3 in the shared mailbox module after some delay to allow baseband processor 24 to update mailbox #3. Mailbox #3 contains the packet length written by applications processor 20, but is over-written by base-band processor 24 with a zero once base-band processor 24 has read the packet. Thus once a zero is read from mailbox #3, step 168, the transmitted packet has been received. The GPIO line can then be set low, step 170, and the transmit pointer is incremented, step 172. The next packet can then be transmitted.

Figure 8B:
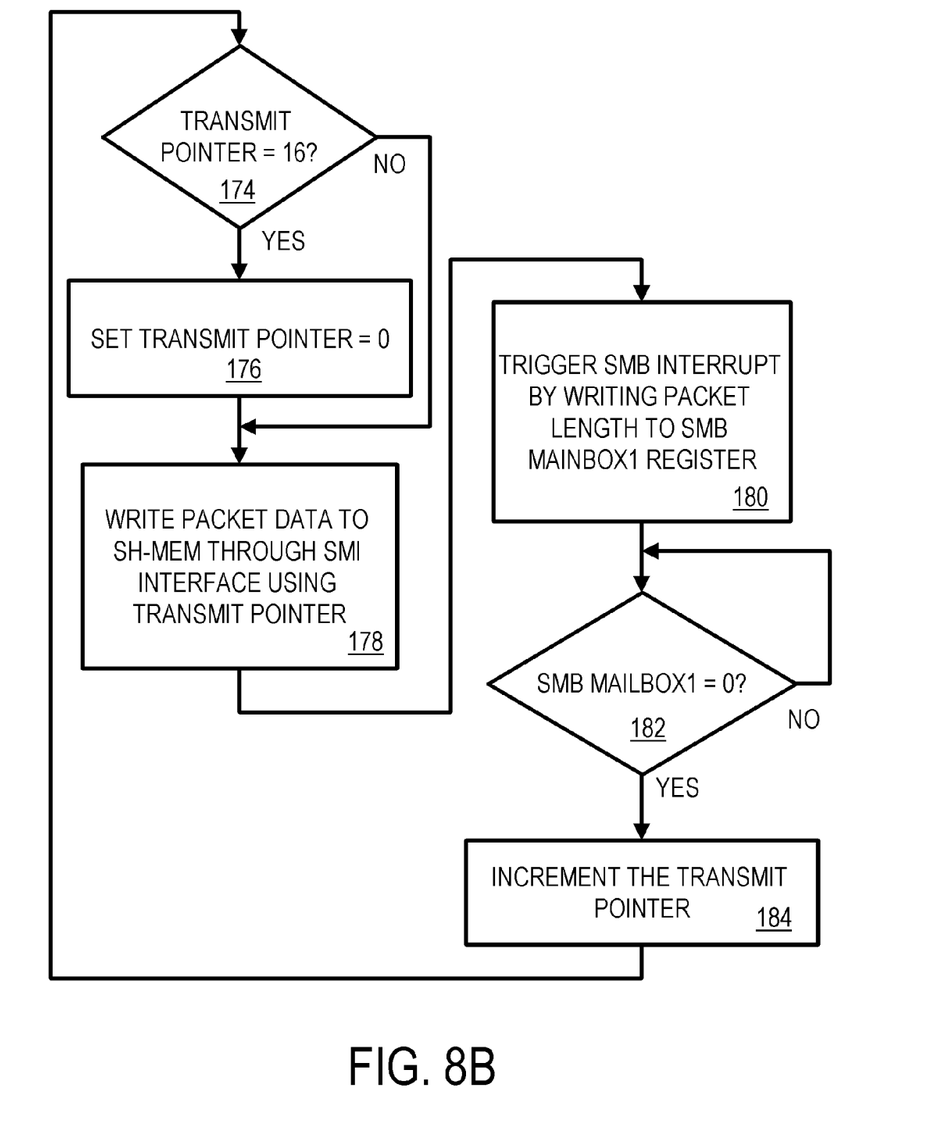
FIG. 8B is a flowchart of a transmit routine for an Ethernet-emulating driver executing on the base-band processor.

FIG. 8B is a flowchart of a transmit routine for an Ethernet-emulating driver executing on the base-band processor. A high-level application running on base-band processor 24 sends data to the O/S TCP/IP stack for transmission over the internal Ethernet to the applications processor. The IP layer activates this transmit routine since the Ethernet-emulating driver appears to be the lower-level Ethernet-chip driver.

When the transmit pointer has reached the end B-to-A buffer 44, step 174, the pointer value of 16 is wrapped back to 0, the first location in the buffer, step 176. This transmit pointer is used to select locations in the shared memory to write the packet data to, step 178. The data is written from base-band processor 24 through shared-memory interface 38 to shared memory 16.

The length of the packet is written to mailbox #1, step 180. Writing mailbox #1 also causes the interrupt to be sent to the applications processor. Sending an interrupt upon writing to the first mailbox location is a built-in function of the shared mailbox module.

The transmit routine then repeatedly re-reads or polls mailbox #1 in the shared mailbox module after some delay to allow applications processor 20 to write the mailbox. Mailbox #1 contains the packet length written by base-band processor 24, but is over-written by applications processor 20 with a zero-value once applications processor 20 has read the packet. Thus once a zero is read from mailbox #1, step 182, the transmitted packet has been received. The transmit pointer is incremented, step 184, and the next packet can be transmitted by repeating the routine. The next packet could be automatically sent when the IP packet was larger than 1K and divided into several Ethernet packets, or could wait until another packet is sent by the IP layer.

Figure 9:
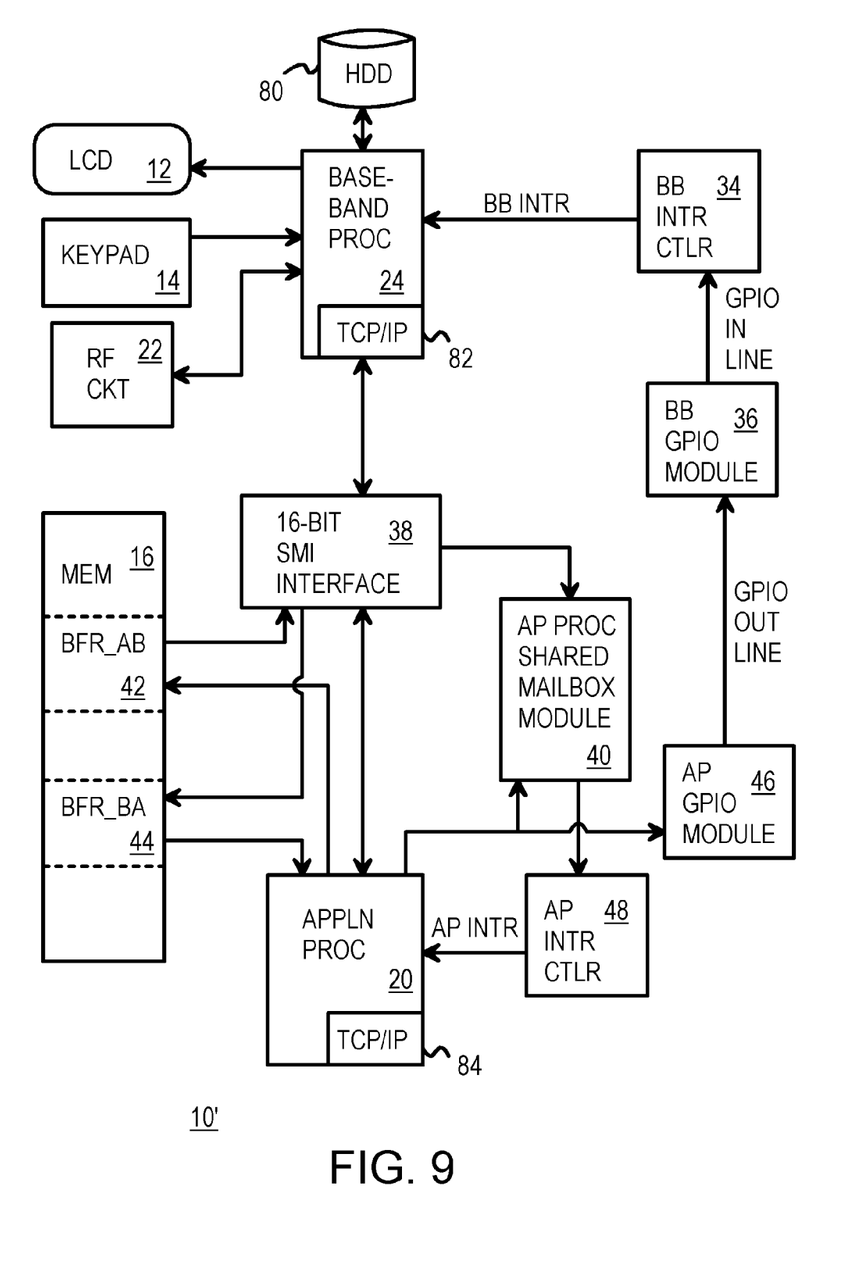
FIG. 9 is a block diagram of a dual-processor feature phone with a shared memory resource.

Network File Sharing—FIG. 9

FIG. 9 is a block diagram of a dual-processor feature phone with a shared memory resource. Most components are as described earlier for FIG. 4.

Shared disk drive 80 is attached to base-band processor 24, and could be a rotating magnetic disk, or a solid-state memory or other mass-storage device. Shared disk drive 80 could be divided into 2 partitions, one for storing data for base-band processor 24, and the other partition for storing data for applications processor 20. Having one shared disk is more space-efficient and cost effective than having 2 separate disk drives for each processor.

The second partition of shared disk drive 80 acts as a network-mapped drive. Applications processor 20 can decode the file system on the second partition of shared disk drive 80 and mount it and use it as a network-attached disk for reading and writing various data and software files.

Applications processor 20 can execute a high-level disk-drive protocol such as network-file-system (NFS) which sends messages to the TCP/IP stack that are transmitted over the emulated Ethernet to base-band processor 24. These messages are extracted from the packets by the TCP/IP stack and eventually sent to a high-level NFS server on base-band processor 24, which reads the data on the second partition of shared disk drive 80.

When separate partitions are used, different disk and data formats can be used by the two processors. The operating systems in both processors could have an interface to interpret the data format on both the partitions, including data for the other processor.

Video Streaming

Another application is video or audio streaming. Base-band processor 24 may be able to access the Internet over the RF phone link to the cellular station. Audio or video packets could be sent by the cellular station server to the feature phone over the wireless phone link and collected by base-band processor 24. Base-band processor 24 can then act as a video server and send the video packets to applications processor 20 using the emulated Ethernet, writing the packets to the shared memory and interrupting the applications processor by writing to the shared mailbox. The applications processor executes a client application that receives the packets from the Ethernet-emulating driver and the TCP/IP stack. The client application could then play the video or audio packets using a dedicated video-display or audio speaker. Separate sockets on base-band processor 24 can connect to the external Internet over the radio link, and connect to applications processor 20 over the shared-mailbox emulated Ethernet. Socket for inter-processor communication can have constant MAC and IP addresses, while other sockets for accessing external data can have a different IP address and a different low-level MAC address.

Keypad and Display Virtualization

Another application of the emulated Ethernet is virtualization of the display and keypad. A client viewer application could be executed on the base-band processor, allowing the client viewer to be displayed on the display attached to the base-band processor. Data inside the client viewer window is obtained from a server application executing on the applications processor. Likewise, user-input to the keypad could be input to a client application executing on the base-band processor, and be sent to a server on the applications processor. Compute-intensive tasks such as 3D games could be executed on the applications processor, but coupled to the user through viewer client applications running on the base-band processor.

While other interfaces between the two processors could be developed, such development would require a greater effort. The existing TCP/IP stacks may have to be altered, and compatibility and reliability could be compromised. Instead, only Ethernet-emulating drivers need to be developed for use with existing TCP/IP stacks. The existing TCP/IP stacks do not have to be altered except to point to the Ethernet-emulating drivers in place of a DLL or Ethernet-chip driver. A high bandwidth can be supported since a shared memory acts as the transfer medium rather than a twisted-pair cable or other serial data-transfer path.

ALTERNATE EMBODIMENTS

Several other embodiments are contemplated by the inventor. Other packet sizes could be stored in the shared memory, and the pointers could be advanced by these packet sizes rather than by 1 K bytes. A larger word or memory line rather than a byte could be the addressing size, and pointer incrementing could be adjusted. Internal pointers may use different units than the transmit and receive pointers. Direct-memory access (DMA) could be used for data transfer and use its own DMA pointers.

IP addresses and TCP ports may be assigned as dummy values during initialization. A fixed IP address could be assigned during phone manufacture. Multiple high-level applications can share the network by using different sockets when calling the TCP/IP stack. For example, video or audio streaming between processors is performed using one socket, while another socket is set up for playing the ring tone when a new call is received.

Different TCP ports could also be used. Rather than use TCP, some applications such as video streaming may use User Datagram Protocol (UDP) or another protocol. While emulating Ethernet has been described, other low-level network protocols could be emulated, such as token ring or another local-area-network (LAN) or even a wide-area-network (WAN).

The shared disk drive could be attached to applications processor 20 rather than to base-band processor 24. Additional memories, interrupt sources, and links could be added, and additional functions supported. Hardware, software, firmware, or a variety of combinations may be used to implement various functions and modules described herein. The two processors could each be integrated with memories, interrupt controllers, and I/O devices and could even be integrated together on a large chip.

The feature phone could have a variety of integrated features and hardware, such as a camera for capturing video or still photos, phone and address books, databases, projection displays or keyboards, etc. The feature phone could be a personal digital assistant (PDA) or other handheld or wearable device with wireless communications capabilities over wireless phone networks.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A feature wireless-communications device comprising:
    a wireless transceiver circuit for sending and receiving wireless data over a wireless network using wireless protocols;
    a base-band processor, coupled to control the wireless transceiver circuit, for executing routines using a first operating system that contains a first network stack for a network protocol that is a different protocol than the wireless protocols;
    an applications processor for executing routines using a second operating system that contains a second network stack for the network protocol that is a different protocol than the wireless protocols;
    a shared memory having a first buffer that is written by the base-band processor and read by the applications processor and a second buffer that is written by the applications processor and read by the base-band processor;
    a first general-purpose input-output (GPIO) module, coupled to read a signal on a GPIO line and generate a first interrupt to the base-band processor in response to the signal on the GPIO line;
    a second GPIO module, coupled to write the signal onto the GPIO line in response to a command from the applications processor;
    a shared mailbox, coupled to be written by the applications processor and by the base-band processor, having a plurality of mailbox locations, wherein writing to a first mailbox location in the shared mailbox generates a second interrupt to the applications processor;
    a first physical-network-emulating driver, executed by the base-band processor in response to the first interrupt, the first physical-network-emulating driver reading a first network packet from the second buffer in the shared memory in response to the first interrupt; and
    a second physical-network-emulating driver, executed by the applications processor in response to the second interrupt, the second physical-network-emulating driver reading a second network packet from the first buffer in the shared memory in response to the second interrupt;
    wherein the first network packet is sent to the first network stack by the first physical-network-emulating driver, the first network stack removing a packet header from the first network packet before sending data from the first network packet to a program executing on the base-band processor;
    wherein the second network packet is sent to the second network stack by the second physical-network-emulating driver, the second network stack removing a packet header from the second network packet before sending data from the second network packet to an application program executing on the applications processor,
    whereby communication between processors is emulated by the first and second physical-network-emulating drivers over an emulated physical network using the shared memory.

2. The feature wireless-communications device of claim 1 wherein the first physical-network-emulating driver further comprises:
    a first transmit module, activated by the first network stack in response to data from the program executing on the base-band processor, the first transmit module writing the data encapsulated in the second network packet by the first network stack to the first buffer in the shared memory and writing to the first mailbox location in the shared mailbox to generate the second interrupt to the applications processor;
    wherein the second physical-network-emulating driver further comprises:
    a second transmit module, activated by the second network stack in response to data from the application program executing on the applications processor, the second transmit module writing the data encapsulated in the first network packet by the second network stack to the second buffer in the shared memory and commanding the second GPIO module to write the signal onto the GPIO line to generate the first interrupt to the base-band processor.

3. The feature wireless-communications device of claim 2 wherein the packet headers contain a source network address and a destination network address.

4. The feature wireless-communications device of claim 3 wherein the packet headers contain Internet Protocol IP addresses for the applications processor and for the base-band processor.

5. The feature wireless-communications device of claim 4 wherein the first network stack comprises a Transport-Control-Protocol/Internet Protocol (TCP/IP) stack having a TCP layer and an IP layer;
    wherein the second network stack comprises a TCP/IP stack having a TCP layer and an IP layer,
    wherein the first and second network packets each have an IP header and a TCP header that are written into the shared memory.

6. The feature wireless-communications device of claim 5 wherein the first physical-network-emulating driver emulates an Ethernet or a token ring physical network or a local-area-network that encapsulate IP packets with a physical-network header having a physical-network address.

7. The feature wireless-communications device of claim 6 wherein the physical-network address is an internal Ethernet address that is not visible over the wireless network, or an internal media-access-controller MAC address.

8. The feature wireless-communications device of claim 4 wherein the first operating system and the second operating system are different operating systems, but the first network stack and the second network stack are for a same network protocol.

9. The feature wireless-communications device of claim 4 further comprising:
    a display, coupled to the base-band processor, for displaying call information to a user generated by the baseband processor;
    a keypad, coupled to the base-band processor, for receiving user inputs to the base-band processor, the user inputs including phone numbers for placing calls over the wireless network.

10. The feature wireless-communications device of claim 4 further comprising:
    a first interrupt controller, coupled between the first GPIO module and the base-band processor;
    a second interrupt controller, coupled between the shared mailbox and the applications processor.

11. The feature wireless-communications device of claim 4 further comprising:
    a shared disk drive, coupled to the base-band processor, for storing data from the base-band processor in a first partition and for storing data for the applications processor in a second partition;
    wherein the shared disk drive is accessed by the applications processor using the second physical-net-work-emulating driver.

12. A method for transferring data from a first processor to a second processor within a mobile device comprising:

receiving first application data from a first application executing on the first processor;

forming a first packet header with a network address of the second processor as a destination address and a network address of the first processor as a source address;

encapsulating the first application data with the first packet header to form a first network packet;

writing the first network packet to a shared memory using a first write pointer;

writing a packet length of the first network packet to a first shared mailbox;

activating an output line to the second processor to interrupt the second processor;

in response to the interrupt to the second processor, the second processor reading the packet length from the first shared mailbox;

reading the first network packet from the shared memory using a second read pointer and discarding any data past the packet length;

incrementing the second read pointer;

extracting the first application data from the first network packet by discarding the first packet header read from the shared memory using the second read pointer but passing the first application data to a second application executing on the second processor;

the second processor clearing the first shared mailbox; and once the first shared mailbox has been cleared, incrementing the first write pointer and de-activating the output line, whereby application data is encapsulated with the first packet header and stored in the shared memory, but never transmitted over a network medium when being transmitted from the first processor to the second processor within the mobile device.

13. The method of claim 12 further comprising:

initializing the first processor by assigning a media-access-controller MAC address to the first processor;

initializing the second processor by assigning a second MAC address to the second processor, the second MAC address being added to the first packet header as a physical destination address.

14. The method of claim 13 further comprising:

adding a physical-network header to the first packet header, the physical-network header comprising the physical destination address.

15. The method of claim 12 wherein the mobile device is a mobile telephone, and wherein the first processor is a base-band processor and the second processor is a applications processor.

16. The method of claim 12 wherein a physical network between the first processor and the second processor is emulated although a physical network does not exist between the first and second processors.

17. An applications processor for communicating with a base-band processor comprising:

processing means for executing high-level programs using an operating system;

network stack means, executing in response to the operating system, for encapsulating data from the high-level programs with a packet header;

shared memory means for storing data as network packets;

inter-processor interface means, coupled between the shared memory means and the base-band processor, for allowing the base-band processor to read and write packets to the shared memory means;

shared mailbox means, coupled to the inter-processor interface means and to the processing means, for generating a first interrupt in response to the base-band processor writing to a first location in the shared mailbox means;

output means, coupled to the processing means, for driving an interrupt signal onto an output line to the base-band processor;

physical-layer receive means, executing on the processing means, for reading a network packet from the shared memory means in response to the first interrupt, the physical-layer receive means passing the network packet to the network stack means, the network stack means removing the packet header and sending packet data to one of the high-level programs; and physical-layer transmit means, executing on the processing means, for writing the network packet to the shared memory means, the physical-layer receive means receiving the network packet with the packet header from the network stack means;

wherein the physical-layer transmit means is also for causing generation of the interrupt signal from the output means to the output line after the network packet is written to the shared memory means, whereby network packets with packet headers are sent between processors using the shared memory means.

18. The applications processor of claim 17 wherein the network stack means comprises an Internet Protocol IP layer that adds an IP header to the network packet, the IP header including a destination IP address for the baseband processor and a source IP address for the applications processor.

19. The applications processor of claim 18 wherein the network stack means further comprises a Transport-Control-Protocol TCP layer or a User Datagram Protocol UDP layer.

20. The applications processor of claim 18 wherein the physical-layer transmit means and the physical-layer receive means are further for emulating a physical layer of an internal IP network, wherein the internal IP network has an emulated physical layer rather than a physical transmission media.

21. The applications processor of claim 20 wherein the internal IP network is a two-endpoint network coupled between the applications processor and the base-band processor, whereby the internal IP network has only two network nodes.

22. The applications processor of claim 21 wherein the applications processor and the base-band processor are within a mobile telephone;

wherein the internal IP network is internal to the mobile telephone.

* * * * *